US010645951B2

(12) United States Patent
Fernandes De Siqueira Machado

(10) Patent No.: US 10,645,951 B2
(45) Date of Patent: May 12, 2020

(54) INDUSTRIAL METHOD FOR RECOVERING PHOSPHOLIPIDS AND PRODUCING LECITHIN FROM A RESIDUE FROM THE PRODUCTION OF SOY PROTEIN CONCENTRATE

(71) Applicant: Paula Fernandes De Siqueira Machado, Curitiba (BR)

(72) Inventor: Paula Fernandes De Siqueira Machado, Curitiba (BR)

(*) Notice: Subject to any disclaimer, the term of this patent is extended or adjusted under 35 U.S.C. 154(b) by 0 days.

(21) Appl. No.: 16/062,620

(22) PCT Filed: Dec. 9, 2016

(86) PCT No.: PCT/BR2016/050317
§ 371 (c)(1),
(2) Date: Jun. 14, 2018

(87) PCT Pub. No.: WO2017/100886
PCT Pub. Date: Jun. 22, 2017

(65) Prior Publication Data
US 2019/0000113 A1    Jan. 3, 2019

(30) Foreign Application Priority Data

Dec. 15, 2015   (BR) .......................... 1020150313837

(51) Int. Cl.
*A23J 7/00* (2006.01)
*A23J 1/00* (2006.01)
*A23J 3/16* (2006.01)
*C07F 9/10* (2006.01)

(52) U.S. Cl.
CPC ................. *A23J 7/00* (2013.01); *A23J 1/006* (2013.01); *A23J 3/16* (2013.01); *C07F 9/103* (2013.01); *A23V 2002/00* (2013.01); *A23V 2250/1842* (2013.01); *A23V 2300/10* (2013.01); *A23V 2300/14* (2013.01); *A23V 2300/24* (2013.01); *A23V 2300/26* (2013.01); *A23V 2300/31* (2013.01); *Y02P 60/877* (2015.11)

(58) Field of Classification Search
CPC ...... A23J 7/00; A23J 1/006; A23J 3/16; C07F 9/103
See application file for complete search history.

(56) References Cited

U.S. PATENT DOCUMENTS 6,251,420 B1 * 6/2001 Miljkovic ............ A61K 31/352
424/439

* cited by examiner

*Primary Examiner* — Anthony J Weier
(74) *Attorney, Agent, or Firm* — B. Aaron Schulman, Esq.; Stites & Harbison, PLLC

(57) ABSTRACT

The present invention relates to the field of the manufacture of food compounds derived from processing plant species, more specifically the process taught here provides products resulting from a process for obtaining compounds derived from vegetable raw material. The present invention describes the recovery of lecithin from the micelle/soy molasses, a residue obtained during the soy carrier concentrate (SPC) process. In a first aspect of the invention it describes a process for extracting phospholipids in conjunction with extraction of soluble sugars during the industrial process of obtaining (SPC). In a second aspect, the present invention describes an industrial process for recovering/removing such micelle phospholipids/soy molasses, cleaning and use for the production of soy lecithin.

17 Claims, 1 Drawing Sheet

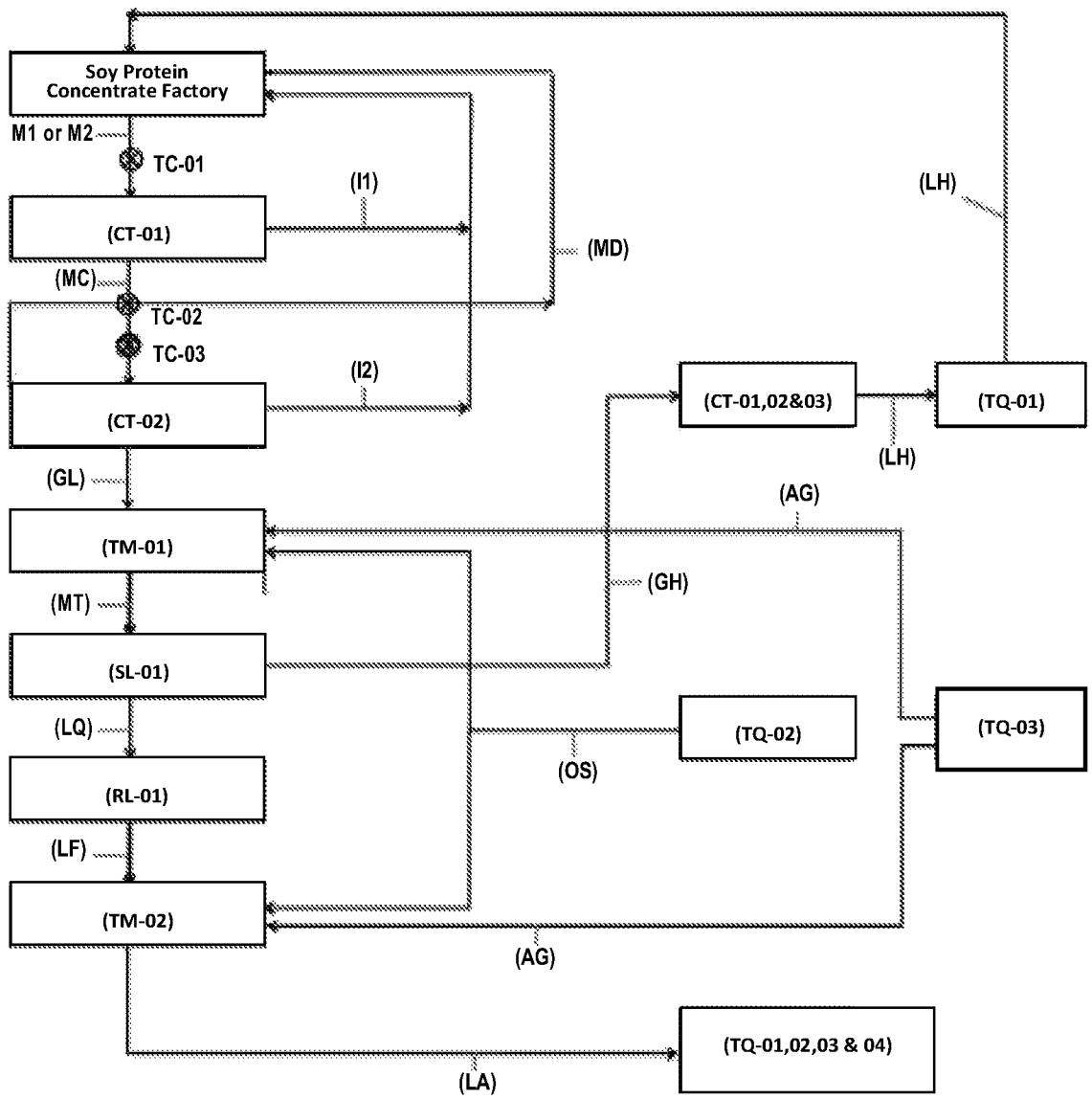

INDUSTRIAL METHOD FOR RECOVERING PHOSPHOLIPIDS AND PRODUCING LECITHIN FROM A RESIDUE FROM THE PRODUCTION OF SOY PROTEIN CONCENTRATE

FIELD OF THE INVENTION

The present invention pertains to the field of manufacturing of food compounds derived from processing plant species, more specifically the process hereinafter provided products from a process for obtaining pigments from the raw vegetable material.

Still more specifically, the present invention describes the recovery of lecithin from micelle/Soya molasses, a residue obtained during the process of obtaining soybean concentrate (SPC). In the first aspect, the invention discloses a process for extracting phospholipids together with the extraction of soluble sugars during the industrial process of obtaining SPC. The extraction of phosphatides not done intentionally, because the objective of the SPC process is to extract soluble sugars from the soybean meal.

In another aspect the present invention discloses an industrial process for recovery/removal of such soybean micelle/molasses phospholipids, cleaning and use for the production at soy lecithin. In addition, as is well known, the conventional soybean lecithin production process always originated from crude soybean oil, never having any process been found from molasses/soybean micelles (SPC Production residue)

BACKGROUND OF THE INVENTION

In the micelle tanks of a soybean protein concentrate production plant, a precipitation of a dirty gum was observed. This dirty gum was taken to the laboratory, where analyzes and experiments were carried out to remove impurities in an attempt to identify it. After two days of research it was discovered that this gum was a mixture of phospholipids, the main raw material for the production of soy lecithin. This discovery was surprising, since it was believed until now that lecithin could only be obtained from crude soya oil, with a yield of up to 1% and still only vary between 0.4-1.0% based on soybean with 14% humidity.

Thus, different processes for the cleaning and purification of this dirty gum were studied, followed by the hearing evaluation of products needed to produce lecithin, as well as different types of drying and cooling. After the conclusion of all the studies, the present industrial process for the development of the micelle/molasses for the production of soya lecithin was developed. The new process is able to provide a yield of lecithin, soy base, between 2-4% based soy bean with 14% moisture.

There are a number of known and patented processes for the production of soy lecithin, however, all depart from crude soybean oil. In no process is the molasses/sequester micelle (SPC production residue) used; or of defatted soybean meal (Residue from the production of soya oil), as in the industrial process which is represented here.

PRIOR ART

Brazilian paper P10704760-6 A2 discloses an industrial process for the production of soybean meal and soybean molasses. The process consists in extracting the sugars from the bran obtained after the extraction of soybean oil, by washing the bran with water and ethyl alcohol, so the said bran has a protein concentration in dry basis, which varies between 60 and 75%.

Brazilian document P10704513A2 discloses a process for obtaining soybean meal using a solvent recovery system based on a specific low vapor consumption per liter of recovered solvent. Thus the process that modifies stages of bran production improves both efficiency and chain yield as a whole.

The Brazilian document P10704513A2 discloses an industrial process of ethyl alcohol based on the fermentation of soybean molasses, which is produced by the extraction of sugars, generated from the soybean protein concentration process. The process is aimed at obtaining ethanol or ethyl alcohol from soybean on an industrial scale for the production of fuels and other derivatives.

The Brazilian document P1090036-0 discloses a process of burning of industrial plant residues where the steam generating boiler uses the heat capacity of the residue of vegetal origin for the generation of energy, thus creating a less polluting system for the environment. The process still counts on a viscosity control of the residues, thus allowing its complete burning, in addition the generated steam is used for the generation of energy by means of a generator.

The Brazilian document P10900363-0 A2 discloses a process of burning of industrial plant residues where the steam generating boiler uses the heat capacity of the residue of vegetal origin for the generation of energy, thus creating a system less polluting to the environment. The process still counts on a viscosity control of the residues, thus allowing its complete burning, in addition the generated steam is used for the generation of energy by means of a generator.

The Brazilian document P10215504-4 A2 discloses a process for the production of soybean sugars, where it describes soybean molasses as a source of soybean sugars that have a high content of oligosaccharides, which is an important characteristic for the final product. Thus, the invention describes a method of purifying soybean molasses, where in the final product is a purified molasses of 90% by weight of sugars, dried.

BRIEF SUMMARY OF THE INVENTION

The invention discloses a method of recovering a soy lecithin from a residue of the soy protein concentrate production, wherein said residues are micelle or molasses. The soybean micelle (M1) or (M2), still molasses ethanol, is then sent to a heat exchanger (TC-01) to obtain a temperature (Ti) between 10° C. and 90° C., then sent to the (CT-01) or by means of a filter press or rotary basket filter settling tank, where two streams are obtained: a stream (11) composed of impurities plus very fine bran and another centrifuged micelle stream (MC). The centrifuged micelle (MC) Is then sent to another heat exchanger (TC-02) to obtain a temperature (T2) between 10 and 90° C., then is sent to a heat exchanger (TC-03) to obtain a temperature (T3) between 10 and 90° C. followed by centrifugation (CT-02), where three outflow currents were obtained: clean gum containing ethanol solution (GL), demogonated micelle (MD) and impurities plus bran containing ethanol solution (12). The cleaned gum (GL) is thus sent to a mixing tank (TM-02), that mixture (MT) is homogenized in a mixing tank (TM-01) and goes to a continuous or batch lecithin dryer (SL (GH) is formed during the drying of the mixture (MT), after leaving the dryer (SL-01) and warm lecithin (RL-01), in which it must obtain a temperature (T6) at 10° C. to 60° C. Then, cold alectin (LF) then goes to another mixing tank (TM-02), where the final adjustment of the quality parameters of the finished lecithin will be performed, after said final quality adjustment to fluidized soybean lecithin from molasses is ready to go to the lecithin storage tanks (TQ-01), (TQ-02), (TQ-03), (TQ-04).

BRIEF DESCRIPTION OF THE DRAWING

FIG. 1 represents the flowchart of the lecithin production process from molasses/micelle.

DETAILED DESCRIPTION OF THE INVENTION

Production of conventional soy lecithin has always been linked to the production of crude soybean eye. The most commercially used processes for the extraction of soybean oil are solvent extraction and press extraction. In both processes, when raw soybean oil is extracted, it carries together large parts of phospholipids, the main raw material for the production of lecithins.

Originally, soy lecithin was considered as an undesirable slurry which needs to be prepared from crude oil (degumming). The reason for the degumming of the crude oil is that during the storage of the gums contained therein they hydrate and precipitate, dragging and occluding oil, causing the formation of precipitate at the bottom of the tanks. This hydrated gum causes a problem of hydrolysis of the oil and consequently the increase of acidity, turbidity of the crude oil and increase of the losses. Over the years, various applications have been developed and soybean lecithin has become an indispensable product for the manufacture of chocolates, paints and baking, making it a high value-added product.

Degumming usually comprises the addition of hot water to the extracted crude oil, followed by a contact period of 10 to 120 minutes for the hydration of the phospholipids. After this period, the formation of an emulsion expands, which is conventionally called gum, and can be separated by centrifugation and subsequently subjected to drying. Drying the gum is done under vacuum, (10 at 300 mm Hg absolute pressure) at temperatures of 40° C.-130° C., in continuous or discontinuous dryers, with residence times of 1-4 minutes or 60-240 minutes, respectively.

After drying, the warm lecithin goes to a cooler and is ready. The yield of the crushed soybean lecithin obtained through the conventional process, described above, historically ranges 0.4% to 1.0%, based on soybeans with 14% moisture.

The present invention makes it possible to increase soybean lecithin production by at least 100% without increasing the need for soybeans or crude soybean oil, raw materials used in the conventional production of soy lecithin. This increase in production is due to the use of a lecithin that is currently discarded along with soybean molasses in crushers that have the SPC production process. It is intended to raise the already known yield of 1.0% to values between (2%-4%) more preferably values above 2.5% base soybeans with 14% moisture in soybean crushers having the extraction process of oil and SPC production.

As was previously shown the industrial process of this invention is based on a residue from the production of soy protein concentrate called molasses and/or soybean micelle. The most widely used process for the production of SPC is the extraction of aqueous ethanol. See documents: P10704760-6A2 and P10704513-1A2 mentioned in the prior art. The patents cited consist of submitting the defatted soybean meal (Protein between 40 to 55% moisture=12.5%), and consecutive baths with hot aqueous ethanol for the extraction of the soluble sugars. The main objective is to extract soluble sugars, but the aqueous ethanol ends up extracting in small amounts other secondary compounds. The removal of soluble sugars is responsible for concentrating the remaining protein in the soybean meal, obtaining as sole and main product the soy protein concentrate (protein between 60-70 humidity=7.5%) and as a residue of this process molasses of soy.

Molasses mainly consist of soybean sugars and compounds that have been solubilized by the hot aqueous ethanol solution. Thus, it is called micelle, the mixture of sugars and secondary compounds plus ethanol and water, good as molasses is called the mixture of sugars and compounds added in the water. That is, the micelle is molasses that still have ethanol. The existing processes for the production of SPC do not use the micelle/molasses for the production of soy lecithin.

Currently the industries that have SPC, inside and outside the country, use a technology of extraction of soluble sugars with alcoholic solution from defatted soybean meal, obtaining the SPC as only product and a process residue dominated soy molasses. Therefore, this proposed technology would allow soybean molasses to be better utilized, allowing two main products to be obtained: SPC and soy lecithin and as the residue soybean molasses (with the same amount of defatted soybean meal).

There are three patents cited in the state of the art which describe the use of soy molasses as a raw material, but none for the production of soy lecithin. See document P10800592-0 A2 describes the use of molasses for steam and energy generation by boiler firing. Finally, the document P10215504-4, which is intended to describe the purification and concentration of sugars from soy molasses in powder form.

The main object of the present invention is to disclose and protect the industrial process for producing lecithin from molasses soybean micelle. The industrial process is outlined in FIG. 1. The beginning of the proposed process is based on the liquid part, alcoholic micelle, from the industrial plant of soy protein concentrate (SPC). This micelle may be capped and sent to the process of this invention at any point in the SPC process, with option 1 being the case where the micelle leaves the extractor, M1, of the SPC plant with 2% to 10% solids and option 2, wherein the micelle exits the first set of evaporators, M2, from the SPC plant with 5% to 20% solids.

The use of the micelle of option 1 presents a higher yield of precipitation in relation to the second form of production. However, both the alcoholic micelle leaving the extract M1 (210% solids) and the micelle leaving the evaporation M2 (5-20% solids), both can be used. The micelle then proceeds to the heat exchanger (TC-01) to obtain temperature Ti between (10-90° C.) and then sent for centrifugation, (CT-01) for the removal of impurities from the process. This removal of impurities can also be done in any type of filter (press, rotary basket and others), settling tank or any other equipment able to remove line solids from this liquid material. In the centrifugation (CT-01) two currents will be obtained: a stream (11) composed of impurities plus fine bran and another centrifuged micelle stream (MC). The stream (11), composed of impurities plus fine bran, is a residue of the micelle cleaning and can be sent back to the SPC process. As this residue has ethanol, the stream (11) more preferably should and can be dosed in the extractor, the presses, the desolventilizers or any of the conveyors that feed any of the equipment mentioned. Thus, this residue will be mixed with the soybean protein concentrate itself, which at any of the above points also still has ethanol, both of which are now (11) and SPC, shipped together to the desolventization. The desolventization is an equipment of the industrial plant of SPC that has as a function to remove ethanol of the SPC. The centrifuged micelle (MC) is then sent to another heat exchanger (TC-02) in order to obtain temperature T2 between (10-90° C.) and goes to the heat exchanger (TC-03) to obtain temperature 13 between (10-90° C.). After the micelle passes through the two exchangers mentioned, it is sent to the centrifuging step (CT-02). In the centrifugation step (CT-02) the gum, rich in soy phospholipids, is the main raw material for the production of soy lecithin. At this time (CT-02) the formation of three outflow currents occurs: (GL) clean gum containing ethanol solution, (MD) degummed micelle—without gum and (12) impurities plus fine bran, containing ethanol solution. Thus, the decelerated micelle exchanges heat at (TC-2) to obtain a T4 temperature between (10° C.-90° C.) and can now return to the normal processing of the SPC, following its normal distillation flow, or other end that the company finds convenient. The impurities stream, added with thin branches (12), along with the impurities stream plus thin branches (11), which can be dosed in any part of the SPC process prior to the desolventization process, as previously described. The mainstream gum (GL) of this process is sent to a mixing tank. (TM-01) where 1 to 20% of fatty acid (AG) from the tank (TQ-3) and from 1 to 40% of soybean oil (OS) from the tank (TQ-02). This mixture is homogenized in a mixing tank (TM-01). The mixture (MT) leaves the mixing tank (TM-01) and goes to a continuous or batch lecithin drier (SL-01) depending on the preference of the investor. Such drying is intended to reduce the moisture of the gum plus fatty acid and soybean (MT) mixture from approximately 40%-60% to below 1.0% moisture, more between 0.2-0.5 humidity.

Drying of the mixture (MT) is done under a vacuum of 10 to 300 mmHg of absolute pressure, at temperatures of 40° C. to 130° C. in continuous or discontinuous dryers, with residence time of 1-4 minutes or 6-240 minutes, respectively.

A hydro alcoholic gas stream (GH) is formed dating the drying of the mixture (MT). The gas stream (GH) is sent to a set of three capacitors in series (CD-01, 02, 03) where the change of phase of the gas stream (GH) to a liquid stream (LH) occurs. The liquid stream (LH) goes to the tank (TQ-01). The current (LH) stored in the tank (TQ-01) is formed exclusively by ethanol and water, and can be returned to the SPC process to be used as replacement ethanol in the sugar extraction process. After leaving the dryer (SL-01) the hot lecithin (LQ), with temperature T5 between (50-100° C.) goes to the lecithin cooler (RL-01) where it should obtain a temperature 16 between (10° C.-60° C.).

The cold lecithin (LE) goes to another mixing tank (TM-02), where the final adjustment of the quality parameters of the finished lecithin will now be carried out. This final quality adjustment is done by adding fatty acid (AG) and soybean oil (OS) in the required amounts. The quantities of fatty acid and soybean oil to be added depend solely and exclusively on product quality analyses that should be done in the laboratory. After the final quality adjustment the fluid soybean lecithin (LA) pertaining to molasses, is ready to follow the Lecithin storage tanks (TO-01, 02, 03 and 04).

The quality parameters of molasses lecithin and conventional soya bean lecithin are presented in the following table:

| | | QUALITY COMPARISON BETWEEN LECITHINS | | | | |
|---|---|---|---|---|---|---|
| ITEM | PARAMETERS ANALYSIS | LECITHIN CONVENTIONAL PROCESS RESULTS | LECITHIN OBTAINED NEW PROCESS RESULTS | SPECIFICATION LECITHIN MARKET LIMITS | PARAMETERS UNITS | LECITHIN CONVENTIONAL PROCESS ANALYSIS METHOD |
| 1 | INSOLUBLE ACETONE | 62 | 62 | Min. 62 | % | Ja 4-46[1] |
| 2 | MOISTURE | 0.41 | 0.2 | Max. 0.5 | % | Ja 2b-87[1] |
| 3 | INSOLUBLE HEXANE | 0.09 | 0.03 | Max. 0.1 | % | Ja 3-87[1] |
| 4 | ACIDITY LEVEL | 30 | 30 | Max. 30 | mgKOH/g | Ja 6-55[1] |
| 5 | ACIDITY | 15 | 15 | Max. 15 | % | Ja 6-55[1] |
| 6 | GARDNER COLOR | 9.6 | 7 | Max. 10 | — | ASTMD - 1544 |
| 7 | PERIDOXIDE INDEX | 0.7 | 0.7 | Max. 3.00 | meq/kg | Ja 8-87[1] |
| 8 | VISCOUSNESS | 110 | 97 | Max. 120 | Poise | Ja 10 - 87[1] |
| 9 | IRON | 49.25 | 11 | Max. 110 | ppm | |
| 10 | TOTAL PHOSPHOLIPIDS | 41.2 | 48.26 | | | |
| 11 | Phosphalitidic Acid | 3.2 | 4.55 | | | CHROMATOGRAPHY |
| 12 | Phosphatidylethanolamina | 7.12 | 8.08 | | | CHROMATOGRAPHY |
| 13 | Phosphatidylcholine | 13.12 | 18.33 | | | CHROMATOGRAPHY |
| 14 | Phosphatidylinositol | 9.79 | 14.55 | | | CHROMATOGRAPHY |
| 15 | other Phosphatides | 7.97 | 4.74 | | | CHROMATOGRAPHY |

Finally, it is worth mentioning that the cleaned gum stream (GL) generated fluid soy lecithin as the final product obtained by the process obtained above and with quality parameters set out in the table in the previous paragraph. The same described process of cleaning, recovering/removing until obtaining the clean gum (GL) can be used for the production of lecithin powder instead of fluid lecithin, where for the production of lecithin powder the extracted cleaned gum stream (GL), obtained after centrifugation (CT-02) can be followed for the extraction of lipids with acetone. Either the final fluid lecithin (LA) produced by the process described in that patent may also proceed for the extraction of lipids with acetone to generate lecithin powder. Both processes can take advantage of clean gum (GL) or ultimate fluid lecithin (LA) for the production of powdered lecithin.

The claimed soy lecithin recovery process may also be used by companies that do not produce soy protein concentrate but wish to purchase soya molasses on the market and the process described in that patent. To do so, it will be necessary to add at the beginning a step in the described process of dilution of soybean molasses. This step should comprise dilution with an ethanol-water solution in which the molasses purchased in the soybean micelle M1 or M2 described in this patent will be processed so that the process can be applied. The purpose of this dilution is to transform commercially available soybean molasses (60%-90% solids) into a micelle with an ethanol concentration between (30%-90% ethanol) and reach a concentration of solids in the micelle between (2% to 20% solids).

It should also be clear that both the soluble sugars extracted with hydro alcohol solutions in the patented SPC processes and the phospholipids are extracted from the defatted soybean meal. Both soluble sugars and phospholipids were present in the defatted soybean meal and were extracted with alcoholic solution and then stopped in the soybean micelle and consequently in the soybean molasses. This means that it can be said that the present patent is also concerned with the preparation of soy lecithin from defatted soybean meal. Both denominations express the same process, seen only by a different angle.

The invention claimed is:

1. An industrial process for producing soy lecithin from soybean micelles derived from a soy protein concentrate process, comprising:
  a. sending the soybean micelles to a first heat exchanger to obtain a first temperature in the range of 10° C.-90° C.;
  b. sending the soybean micelles from a) to a first centrifuge or a filter to remove impurities, resulting in a first stream of impurities and fine fines, and a second stream of centrifuged micelles;
  c. sending the centrifuged or filtered micelles to a second heat exchanger to obtain a second temperature between 10° C. and 90° C.;
  d. sending the centrifuged or filtered micelles from c) to a third heat exchanger to obtain a third temperature between 10° C. and 90° C.;
  e. sending the centrifuged or filtered micelles from d) to a second centrifuge to obtain a third stream of clean gum containing ethanol solution, a fourth stream of degummed micelles, and a fifth stream of impurities and fine fines containing ethanol solution;
  f. sending the clean gum from e) to a first mixing tank where the clean gum is homogenized with 1% to 20% of fatty acid from a first tank and 1% to 40% of soybean oil from a second tank to create a mixture;
  g. sending the mixture from f) to a continuous or batch lecithin dryer which produces hot lecithin with a fourth temperature between 50° C. and 100° C., and a hydro alcoholic gas stream;
  h. sending the hot lecithin from g) to a lecithin cooler to obtain cold lecithin with a fifth temperature between 10° C. to 60° C.;
  i. sending the cold lecithin from h) to a second mixing tank for a final adjustment involving an addition of fatty acid and soybean oil to produce a fluid soy lecithin; and
  j. sending the fluid soy lecithin from i) to lecithin storage tanks.

2. The industrial process according to claim 1, wherein the micelles in a) are micelles with 2% to 10% solids obtained from an extractor of the soy protein concentrate process, or micelles with 5% to 20% solids obtained from a set of evaporators of the soy protein concentrate process.

3. The industrial process according to claim 1, wherein the micelles in b) are sent to the first centrifuge to remove impurities.

4. The industrial process according to claim 1, wherein the fine fines of the first stream in b) are fine bran.

5. The industrial process according to claim 1, wherein the third stream of clean gum contains purified phospholipids, the fourth stream of degummed micelles are composed of soluble sugars removed in the soy protein concentrate process and ethanol solution, and the fine fines of the fifth stream are fine bran.

6. The industrial process according to claim 1, wherein the drying of the mixture in g) is carried out under a vacuum of 10 mmHg to 300 mmHg of absolute pressure at temperatures between 40° C. to 130° C. in continuous or discontinuous dryers, with residence times of 1 to 4 minutes for continuous dryers and 60 to 240 minutes for discontinuous dryers; and
  wherein a moisture of the mixture is decreased from 40% to 60% to below 1.0% of moisture.

7. The industrial process according to claim 6, wherein the moisture of the mixture is reduced to between 0.2 to 0.5 humidity.

8. The industrial process according to claim 1, wherein the first stream of impurities and fine fines is sent back to the soy protein concentrate process.

9. The industrial process according to claim 1, wherein the first stream of impurities and fine fines is mixed with a soy protein concentrate, then dosed in an extractor, presses, a desolventizer, or a conveyor feeding one of the extractor, the presses and the desolventizer.

10. The industrial process according to claim 1, wherein the fifth stream of impurities and fine fines joins the first stream of impurities and fine fines to be sent back to the soy protein concentrate process.

11. The industrial process according to claim 1, wherein the fourth stream of degummed micelles are sent to the second heat exchanger to obtain a sixth temperature between 10° C. and 90° C. and returned to the soy protein concentrate process.

12. The industrial process according to claim 1, wherein the third stream of clean gum undergoes lipid extraction with acetone to produce powdered lecithin.

13. The industrial process according to claim 1, wherein the hydro alcoholic gas stream is sent to a set of three capacitors in series to create a liquid stream formed by ethanol and water, which flows into a third tank to be returned to the soy protein concentrate process for use as spare alcohol in a sugar extraction process.

14. The industrial process according to claim 1, wherein the final adjustment is carried out by adding fatty acid and soybean oil in amounts that will depend on laboratory quality analysis of the fluid soy lecithin.

15. The industrial process according to claim 1, wherein the fluid soy lecithin undergoes lipid extraction with acetone to produce powdered lecithin.

16. The industrial process according to claim 1, wherein commercially available soybean molasses is used to produce soy lecithin, which involves preparation comprising:
  a. diluting the soybean molasses with an ethanol-water solution to transform the soybean molasses containing 60% to 90% solids into a micelle with an ethanol concentration between 30% and 90% and a solids concentration between 2% and 20%.

17. The industrial process according to claim 16, wherein the soybean micelles or the soybean molasses are obtained from defatted soybean meal following extraction of soluble sugars from the defatted soybean meal using alcoholic solution.

* * * * *